(12) United States Patent
Tetsufumi et al.

(10) Patent No.: US 10,144,869 B2
(45) Date of Patent: Dec. 4, 2018

(54) SILICATE PHOSPHOR AND METHOD FOR PRODUCING THE SAME

(75) Inventors: Komukai Tetsufumi, Chiba (JP); Takatsuka Yuji, Chiba (JP); Kakihana Masato, Miyagi (JP); Tezuka Satoko, Miyagi (JP); Kato Hideki, Miyagi (JP)

(73) Assignees: SUMITOMO METAL MINING CO., LTD., Tokyo (JP); TOHOKU UNIVERSITY, Sendai-shi (JP)

( * ) Notice: Subject to any disclaimer, the term of this patent is extended or adjusted under 35 U.S.C. 154(b) by 459 days.

(21) Appl. No.: 14/413,026

(22) PCT Filed: Jul. 6, 2012

(86) PCT No.: PCT/JP2012/067372
§ 371 (c)(1),
(2), (4) Date: Jun. 3, 2015

(87) PCT Pub. No.: WO2014/006755
PCT Pub. Date: Jan. 9, 2014

(65) Prior Publication Data
US 2015/0299565 A1    Oct. 22, 2015

(51) Int. Cl.
*C09K 11/77* (2006.01)
(52) U.S. Cl.
CPC ................. *C09K 11/7734* (2013.01)
(58) Field of Classification Search
CPC .................................. C09K 11/7734
USPC .................................. 252/301.4 F
See application file for complete search history.

(56) References Cited

U.S. PATENT DOCUMENTS

2010/0102276 A1* 4/2010 Kuze ................ C09K 11/7734
                                                              252/301.4 F

FOREIGN PATENT DOCUMENTS

| JP | 2004-224830 | 8/2004 |
|---|---|---|
| JP | 2006-2043 | 1/2006 |
| JP | 2008-63550 | 3/2008 |
| JP | 2010-7032 | 1/2010 |
| JP | 2010-189583 | 9/2010 |
| JP | 2011-32416 | 2/2011 |
| JP | 2012-92233 | 5/2012 |
| WO | 2011/148910 | 12/2011 |

OTHER PUBLICATIONS

Wang et al., "BaZrSi3O9:Eu2+: a cyan-emitting phosphor with high quantum efficiency for white light-emitting diodes", Jun. 9, 2011, J. Mater. Chem., 21, pp. 10818-10822.*
Kakihana et al., "Exploration of New Phosphors Using a Mineral-Inspired Approach in Combination with Solution Parallel Synthesis", Oct. 2013, Optics and Photonics Journal, 3, pp. 5-12.*
International Search Report dated Jul. 20, 2012.
G. Blasse, et al., "Fluorescence and Structure of Barium Zirconium Trisilicate", Journal of Solid State Chemistry, 1970, vol. 2, p. 105-108.
A high-luminescence BaZrSi3O9:Eu2+ blue-green-emitting phosphor Synthesis and mechanism, (Journal of Luminescence, 181 (2017) 211-216).

* cited by examiner

*Primary Examiner* — Matthew E. Hoban
*Assistant Examiner* — Lynne Edmondson
(74) *Attorney, Agent, or Firm* — Gerald E. Hespos; Michael J. Porco; Matthew T. Hespos (57) ABSTRACT

Provided are a blue phosphor and a method of easily producing the phosphor, the phosphor being excited at a wavelength of about 400 nm, which is an emission wavelength of a near-ultraviolet LED, to emit high-intensity light and having a small change of emission intensity due to a change of an excitation wavelength. The phosphor is silicate phosphor that is represented by a composition formula of $Ba_{1-x}Eu_xZrSi_yO_{3+2y}$ (where $0.001 \leq x \leq 5$ and $2.5 \leq y \leq 3$); has a diffraction pattern of $BaZrSi_3O_9$ as a powder x-ray diffraction pattern; has an emission intensity at an excitation wavelength of 400 nm, the emission intensity being 40% or higher of an emission intensity at an excitation wavelength of 300 nm; and has an emission intensity change ratio represented by $(I_{ex}^{380\,nm} - I_{ex}^{420\,nm})/I_{ex}^{380\,nm} \times 100$, emission intensity change ratio being 30% or lower in a range of excitation wavelengths of 380 nm to 420 nm.

6 Claims, 4 Drawing Sheets

SILICATE PHOSPHOR AND METHOD FOR PRODUCING THE SAME

BACKGROUND

1. Field of the Invention

The present invention relates to a silicate phosphor which exhibits high-luminance blue light emission by excitation by light in a visible region from near-ultraviolet, and method of producing the same.

2. Description of the Related Art

A white LED is produced by combining a blue or near-ultraviolet LED (LD) and a phosphor. Because of low emission efficiency, white LEDs have been developed mainly for the purpose of use as a backlight for portable telephones and the like. In recent years, however, with an increase in emission efficiency, they attract attention as next-generation illumination.

Systems of configuring a white LED including a system of combining a blue LED and a yellow phosphor, a system of combining a near-ultraviolet LED and blue, green, and red phosphors have been suggested.

In a near-ultraviolet LED excitation system, a blue-based phosphor is required in which excitation occurs in the neighborhood of 400 nm, which is an emission wavelength of the LED. $(Ca, Sr)_5(PO_4)_3Cl:Eu$, $BaMgAl_{10}O_{17}:Eu$ (BAM), and the like, which have been used as conventional fluorescent lamp, have been improved and used.

For example, Tsunemasa Taguchi, "All about white LED lighting technology", Kogyo Chosakai Publishing Co., Ltd., p. 110 describes an excitation spectrum and an emission spectrum of BAM improved for near-ultraviolet LED excitation.

As one of phosphors that emit blue light with near-ultraviolet excitation, BaZrSi3O9:Eu has been known. G. Blasse, A. Bril, Journal of Solid State Chemistry, 1970, vol. 2, p. 105 to 108 describes Ba0.99ZrSi3O9:0.01Eu.

Also, Japanese Examined Patent Publication No. 48-38550 discloses (Ba,Sr)0.99ZrSi3O9:0.01Eu, and Japanese Patent Application Laid-Open No. 2008-63550 discloses that as a composition of (Ba(1−x−y)SrxEuy) (Sn1−zZrz)Si3O9, Sr substitutes for a Ba site and Sn substitutes for a Zr site, thereby increasing emission intensity in near-ultraviolet excitation.

However, when the excitation spectrum of BAM described in Tsunemasa Taguchi, "All about white LED lighting technology", Kogyo Chosakai Publishing Co., Ltd., p. 110 is observed, it shows that the excitation intensity is abruptly decreased in the neighborhood of 400 nm, with 380 nm as a peak, and that since the excitation intensity corresponds to emission intensity at that excitation wavelength, this indicates that a change of emission intensity due to a change of an excitation wavelength is large (from analogy, it can be thought from a graph that a change of emission intensity in 380 nm to 420 nm is in the neighborhood of 60%).

When such an abrupt change of emission intensity occurs with respect to the excitation wavelength of the phosphor, fluctuations in blue-light emission intensity due to fluctuations in emission wavelength of an ultraviolet LED as an excitation source are increased, which leads to fluctuations in hue and emission intensity of the white LED. Therefore, this is not preferable.

As for Ba0.99ZrSi3O9:0.01Eu described in G. Blasse, A. Bril, Journal of Solid State Chemistry, 1970, vol. 2, p. 105 to 108 and Japanese Examined Patent Publication No. 48-38550, when its excitation spectrum (refer to Example 2 of FIG. 4(b); curve 6 of FIG. 3 in Japanese Examined Patent Publication No. 48-38550) is observed, it is evident that excitation intensity is abruptly decreased in a near-ultraviolet region and the emission intensity near an excitation wavelength of 400 nm is low (From the excitation spectrum of Japanese Examined Patent Publication No. 48-38550, by analogy, a change of emission intensity at 380 nm to 420 nm is in the neighborhood of 35% and the emission intensity at the excitation wavelength of 300 nm is in the neighborhood of 35% of emission intensity at an excitation wavelength of 400 nm).

Also, the phosphor is formed by a solid phase reaction in which a mixture of BaCO3, ZrO2, SiO2, and Eu2O3 are subjected to a heat treatment in nitrogen-hydrogen mixed gas. In the case of this solid phase reaction, it is difficult to obtain a phosphor with high main phase purity and with Eu uniformly dispersed therein. To make the solid phase reaction sufficiently progress, a heat treatment or repeated baking at high temperatures for a long hours is performed in general. However, such a heat treatment for a long hours and a heat treatment repeatedly performed are not preferable in an industrial point of view. Additionally, since both require crushing, there is a problem of decreasing luminance due to damage.

Moreover, regarding Ba0.98ZrSi3O9:0.02Eu disclosed as a comparative example of Japanese Patent Application Laid-Open No. 2008-63550, its excitation spectrum in the neighborhood of 400 nm is not disclosed. Furthermore, its emission intensity are represented by relative values, and it is thus difficult to compare absolute values. However, since Japanese Patent Application Laid-Open No. 2008-63550 has the producing method approximately similar to the producing method disclosed in G. Blasse, A. Bril, Journal of Solid State Chemistry, 1970, vol. 2, p. 105 to 108 (solid phase method), it can be said in Japanese Patent Application Laid-Open No. 2008-63550 that a change of emission intensity near an excitation wavelength of 400 nm is large and the emission intensity is insufficient. Also, in an embodiment of Japanese Patent Application Laid-Open No. 2008-63550, by Sr substitution for a Ba site, for example, relative luminance with excitation of 365 nm is increased a little over 1.9 times as large as Ba0.98ZrSi3O9:0.02Eu used as the comparative example. However, as described above, Ba0.98ZrSi3O9:0.02Eu itself has low intensity, and it cannot be said that the phosphor has practically sufficient luminance.

Under these circumstances, an object of the present invention is to provide a blue phosphor which is excited at a wavelength in the neighborhood of 400 nm, which is an emission wavelength of a near-ultraviolet LED, to emit high-intensity light and has a small change of emission intensity due to a change of an excitation wavelength, and a method of easily obtaining the phosphor.

SUMMARY OF THE INVENTION

As a result of studies to solve the above-described problems, the inventors have found that a silicate phosphor represented by a composition formula of $Ba_{1-x}Eu_xZrSi_yO_{3+2y}$ where x and y are in a range of $0.001 \leq x \leq 0.5$ and $2.5 \leq y \leq 3$, respectively, and having a diffraction pattern of BaZrSi3O9 type as a powder X-ray diffraction pattern has high emission intensity near an excitation wavelength of 400 nm and has a small emission intensity change ratio with respect to the excitation wavelength.

Furthermore, the inventors have also found that a silicate phosphor represented by a composition formula of $Ba_{1-x}Eu_xZrSi_yO_{3+2y}$ where x and y are in a range of 0.001≤x≤0.5 and 3<y≤6, respectively, having a diffraction pattern of BaZrSi$_3$O$_9$ type (ICDD 29-0214) as a X-ray diffraction pattern, and having a peak derived from SiO$_2$ cristobalite near a Bragg angle (2θ) of 22° has higher emission intensity, among others, such a silicate phosphor having a spectral reflectance at 480 nm being 80% or higher when a value of spectral reflectance of standard white barium sulfate is taken as 100% has higher emission intensity.

Furthermore, regarding the silicate phosphor with the above-described feature, the inventors have found that a silicate phosphor with higher luminance can be obtained in a simplified manner by processes of mixing each metal components of Ba, Zr, Eu, and Si as constituents as an aqueous solution, heating a mixed solution further added with oxycarbonic acid to cause gelation of the mixed solution, then drying to form a gel, baking the gel in atmosphere to remove an organic substance included in the gel and next producing a precursor with the constituents uniformly distributed therein, performing a heat treatment on the obtained precursor in reducing atmosphere to obtain a BaZrSi3O9 crystal phase and, at the same time, reducing and doping a Ba site with Eu to form silicate phosphor powder. In addition, the inventors have found that the emission intensity is further increased by performing a heat treatment on the obtained silicate phosphor powder again in reducing atmosphere, thereby completing the present invention.

That is, a first aspect of the present invention provides a silicate phosphor represented by a composition formula of Ba1-xEuxZrSiyO3+2y (where 0.001≤x≤0.5 and 2.5≤y≤3), wherein the silicate phosphor has a diffraction pattern of BaZrSi3O9 as a powder X-ray diffraction pattern, has an emission intensity at an excitation wavelength of 400 nm, the emission intensity being 40% or higher of an emission intensity at an excitation wavelength of 300 nm, and has an emission intensity change ratio represented by the following Equation (1), the emission intensity change ratio being 30% or lower in a range of excitation wavelengths of 380 nm to 420 nm.

[Equation 1]

$$\text{Emission intensity change ratio (\%)} = (I_{ex}^{380\ nm} - I_{ex}^{420\ nm})/I_{ex}^{380\ nm} \times 100 \quad (1)$$

$I_{ex}^{380\ nm}$: emission intensity at an excitation wavelength of 380 nm, and
$I_{ex}^{420\ nm}$: emission intensity at an excitation wavelength of 420 nm.

Also, a second aspect of the present invention provides a silicate phosphor represented by a composition formula of Ba$_{1-x}$Eu$_x$ZrSi$_y$O$_{3+2y}$ (where 0.001≤x≤0.5 and 3<y≤6), wherein the silicate phosphor has a diffraction pattern of BaZrSi$_3$O$_9$ as a powder X-ray diffraction pattern and a peak derived from SiO$_2$ (cristobalite) near a Bragg angle (2θ) of 22°, has an emission intensity at an excitation wavelength of 400 nm, the emission intensity being 40% or higher of an emission intensity at an excitation wavelength of 300 nm, and has an emission intensity change ratio represented by the Equation (1) above, the emission intensity change ratio being 30% or lower in a range of excitation wavelengths of 380 nm to 420 nm.

Furthermore, in a third aspect of the present invention, the silicate phosphor in the first and second aspects has a spectral reflectance at 480 nm indicating a value of 80% or higher when a value of spectral reflectance of standard white barium sulfate is taken as 100%.

A fourth aspect of the present invention provides a method of producing a silicate phosphor represented by a composition formula of Ba$_{1-x}$Eu$_x$ZrSi$_y$O$_{3+2y}$ (where 0.001≤x≤0.5 and 2.5≤y≤6), including the following steps 1 to 3:

Step 1: a step of mixing Ba, Zr, Eu, and Si elements, the elements being metal components in constituents, as an aqueous solution, adding oxycarbonic acid in a mixed solution, heating the mixed solution to cause gelation of the mixed solution, and then drying to form a gel.

Step 2: a step of baking the gel formed in the step 1 in atmosphere to remove an organic substance included in the gel and producing a precursor with the constituents uniformly distributed therein.

Step 3: a step of performing a heat treatment on the precursor obtained in the step 2 in reducing atmosphere to obtain a BaZrSi$_3$O$_9$ crystal phase and, at the same time, reducing and doping a Ba site with Eu to form silicate phosphor powder which emits light with high luminance.

In a fifth aspect of the present invention, the method further includes a step of performing a heat treatment on the silicate phosphorus powder produced in the step 3 under reducing atmosphere.

Also, in a sixth invention of the present invention, the method further includes a step of performing a heat treatment on the silicate phosphorus powder produced in the step 3 at temperatures 500° C. to 1500° C. under air atmosphere.

According to the present invention, a silicate phosphor can be provided which is efficiently excited at a wavelength in the neighborhood of 400 nm, which is an emission wavelength of a near-ultraviolet LED, and has a small change of emission intensity with respect to an excitation wavelength, and this silicate phosphor can be produced by a more simplified method.

BRIEF DESCRIPTION OF DRAWINGS

FIG. 4 is a diagram for comparing excitation spectrum shapes of the phosphor powders of Examples 1 and 6 and phosphor powder disclosed in PTL 1, (a) representing excitation spectrums of Examples 1 and 6, and (b) representing excitation spectrums of PTL 1 (Example 2).

DETAILED DESCRIPTION

Embodiments for implementing the present invention are described below in detail.

The present invention provides a phosphor represented by a composition formula of $Ba_{1-x}Eu_xZrSi_yO_{3+2y}$, and has a first feature that x and y are in a composition range of $0.001 \le x \le 0.5$ and $2.5 \le y \le 6$, respectively.

More preferably, x is preferably in a range of $0.005 \le x \le 0.2$. While an optimal concentration of Eu differs depending on the value of y, if $x<0.005$, the concentration of Eu as an activator is too low and the emission intensity is decreased. Also, if $x>0.2$, the emission intensity is decreased by concentration quenching.

If $y<2.5$, $SiO2$ is too poor and a heterogeneous phase ($Ba2Zr2Si3O12$) is generated, thereby decreasing the emission intensity.

When $y>3$, the emission intensity is increased. It is thought that the reason for this is that, by excessively providing $SiO2$ more than a theoretical amount, $Eu2O3$ tends to be more reduced and doped.

It is also thought that, by excessively providing $SiO2$ more than the theoretical amount, crystal growth tends to be promoted during a heat treatment. When $SiO2$ is further excessively provided, in an XRD pattern, $BaZrSi3O9$ and $SiO2$ (cristobalite) are detected, which will be described further below.

Since $SiO2$ present in the eventually obtained silicate phosphor does not contribute to light emission, the optimal amount of $SiO2$ is determined by a balance among an effect of increasing the emission intensity in the course of the heat treatment by excessively providing $SiO2$, a decrease in emission intensity due to a decrease in ratio of a phase which contributes to light emission due to a residue of excessive $SiO2$, and an influence to the emission intensity.

When $y>6$, the effect to an increase in emission intensity is hardly present. While a composition with $y>6$ can be adopted when it is an object to make more $SiO2$ left in the phosphor, it is difficult to avoid a decrease in emission intensity.

Also, for the purpose of improving the emission intensity, excitation wavelength, and emission wavelength, it is possible to substitute Sr, Ca, Mg, or the like for part of Ba in the composition formula of $Ba_{1-x}Eu_xZrSi_yO_{3+2y}$, substitute Ti, Hf, Sn, or the like for part of Zr therein, and substitute Ge for part of Si therein.

The silicate phosphor of the present invention has also a feature in which the powder X-ray pattern indicates a diffraction pattern that belongs to $BaZrSi3O9$ described in the powder diffraction data issued by "The International Centre for Diffraction Data": ICDD (29-0214).

$ZrO2$, Ba silicate, Zr silicate, or the like can be contained as a heterogeneous component as long as the amount is so subtle as not to affect emission characteristics. Also, when the composition is rich in $SiO2$, the phosphor has another feature in which a peak derived from $SiO2$ (cristobalite) simultaneously appears near a Bragg angle ($2\theta$) of $22°$.

Further, the silicate phosphor of the present invention has another feature of having an emission intensity at an excitation wavelength of 400 nm, the emission intensity being 40% or higher of an emission intensity at an excitation wavelength of 300 nm, and having an emission intensity change ratio being 30% or lower in a range of excitation wavelengths of 380 nm to 420 nm.

Therefore, with the phosphor excited at a wavelength in the neighborhood of 400 nm, which is an emission wavelength of a near-ultraviolet LED, to emit high-intensity light and having a small change of emission intensity due to a change of the excitation wavelength, the phosphor can be favorably used as a blue phosphor of a near-ultraviolet LED excitation system.

Furthermore, the silicate phosphor of the present invention has another feature of having a spectral reflectance at 480 nm being 80% or higher when a value of spectral reflectance of standard white barium sulfate is taken as 100%. That is, since the spectral reflectance at the emission peak wavelength is high, self absorption of emission is decreased, and therefore high luminance can be obtained.

Next, a method for producing a silicate phosphor according to the present invention is described.

Since it is important for the silicate phosphor of the present invention to uniformly contain Ba, Zr, Eu, and Si, by using a producing method including steps as described below, a phosphor with high emission intensity can be produced more easily.

[Step 1]

This step is to mix Ba, Zr, Eu, and Si elements, which are metal components in constituents, as an aqueous solution, add oxycarbonic acid therein, and heating the mixed solution to cause gelation, and then perform drying to form a gel.

[Step 2]

This step is to perform thermal decomposition and atmospheric baking to remove an organic substance of the gel formed in Step 1 and produce a precursor with the constituents uniformly distributed therein.

[Step 3]

This step is to perform a heat treatment on the formed precursor in reducing atmosphere, thereby obtaining a $BaZrSi_3O_9$ crystal phase and, at the same time, reducing and doping a Ba site with Eu to produce silicate phosphor powder which emits light with high luminance.

The producing method according to the present invention is described in more detail below for each step.

[Step 1]

This step is a step of mixing Ba, Zr, Eu, and Si, that are metal components in the constituents as an aqueous solution, further adding oxycarbonic acid therein, heating the mixed solution to cause gelation, and then drying to form a gel.

First, an aqueous solution of Ba, Zr, Eu, and Si, which are metal components in the constituents, is produced.

As a Ba source, barium chloride $BaCl2$, which is water-soluble Ba salt, barium acetate $Ba(CH3COO)2$, or the like can be used. Or, Ba carbonate may be dissolved into an appropriate acid.

As a Zr source, $ZrOCl2.8H2O$ or $ZrO(NO3)2.2H2O$ can be used. It is preferable to use $ZrOCl2.8H2O$ because of high water solubility.

As an Eu source, europium acetate $Eu(NO3)3.6H2O$ or europium chloride $EuCl2$ can be used. Europium oxide $Eu2O3$ can be used by being dissolved in an appropriate acid.

As a Si source, a water-soluble silicon compound by known art disclosed in PTL 3 can be used.

To produce the water-soluble silicon compound, the method disclosed in PTL 3 may be used. For example, the water-soluble silicon compound can be produced by adding 22.8 g (0.3 mol) of 1,2-propanediol with respect to 20.8 g (0.1 mol) of tetraethoxysilane, mixing for twenty-four hours with stirring using a hot stirrer to achieve the solution temperature of 54° C., and adding 2 g (0.02 mol) of lactic acid therein, and then further mixing at the solution temperature of 54° C. for one hour.

Next, each metal source is weighed so as to have a predetermined mole ratio, and is dissolved into an aqueous solution to be mixed therein. In the case of a small amount, an aqueous solution at a predetermined concentration may be prepared in advance, and a predetermined amount thereof may be weighed with a pipet or graduated cylinder to perform mixing. Then, oxycarbonic acid is further added in the mixed solution, and heating and mixing is performed at 80° C.

An object of adding the oxycarbonic acid is for complexation of metal ions other than silicon.

As oxycarbonic acid, citric acid is preferably used. As for an amount of oxycarbonic acid, one to six-fold moles are preferable with respect to a total amount by mole of all metal elements. An oxycarbonic acid aqueous solution at a predetermined concentration may be prepared in advance, and a predetermined amount thereof may be weighed with a pipet or graduated cylinder to perform mixing.

Then, the mixed solution is heated and mixed at 120° C. and then dried. In the course of the heating and mixing, $SiO_2$ forms a network by hydrolytic reaction and dehydration and condensation. By drying, a gel is formed with the constituents uniformly distributed therein. Before the heating and mixing at 120° C., glycol (such as ethylene glycol or propylene glycol) may be added to the material aqueous solution. In this case, a dehydration ester reaction occurs between the carboxyl group of the oxycarbonic acid and the hydroxyl group of glycol during heating and drying, which makes it possible obtain a polyester high-molecule gel with metal ions uniformly distributed therein.

[Step 2]

This step is a step, for the purpose of removing an organic substance contained in the formed gel, of performing thermal decomposition and atmospheric baking on the gel to form a precursor with the constituents uniformly dispersed therein.

The heat treatment in the atmosphere is performed to dissolve the organic substance contained in the gel and to obtain a precursor with fine oxides of the constituents uniformly distributed therein.

The organic substance contained in the gel refers to one derived from oxycarbonic acid, for example, polyalcohol, such as 1,2-propanediol, that is included in the water-soluble silicon compound, or citric acid to be added for complexation. This removal is preferably performed at 400° C. to 600° C. in the atmosphere.

Then, a heat treatment is further performed at high temperatures in the atmosphere to completely remove residual carbon. Removal of the residual carbon is preferably performed at 600° C. to 1000° C. in the atmosphere. The atmospheric heat treatments may be performed several times at different temperatures as required. Cracking at every heat treatment step is effective to promote decomposition and removal of the organic substance.

Through the step above, a precursor with an oxide derived from the material components finely and uniformly distributed therein can be obtained. A change to the oxide can be estimated from a decrease in prepared weight. Also, uniformity can be checked by X-ray diffraction. When nonuniform precipitation of constituents occurs, a diffraction pattern derived from an oxide or material salt is confirmed.

The precursor obtained by the methodology as described above is preferably amorphous, although depending on a heat treatment temperature condition for carbon removal.

[Step 3]

This step is a step of producing silicate phosphor powder by heating and baking the precursor formed in Step 2 in reducing atmosphere to obtain a $BaZrSi_3O_9$ crystal phase and, at the same time, reducing and doping a Ba site with Eu to form silicate phosphor powder.

By performing a heat treatment on the precursor, a $BaZrSi_3O_9$ crystal phase is obtained. At the same time, $Eu_2O_3$(Eu3+) is reduced to Eu2+, and is used to dope a Ba site. The temperature of the heat treatment (baking) is preferable in a range of 1100° C. to 1500° C., although depending on a final baking condition for the precursor. When the heat treatment temperature is lower than 1100° C., the low heat treatment temperature leads to such results that a target crystal phase cannot be established, and crystal growth is insufficient, thereby decreasing the emission intensity. At a temperature exceeding 1500° C., complete melting occurs, and then strong crushing is required, thereby decreasing the emission intensity due to damage of the crystal by crushing.

Also, by adding a chloride, fluoride, or the like as a flux, crystal growth and particle growth can be promoted. As a flux, for example, LiF, NaF, KF, LiCl, NaCl, KCl, Li2CO3, Na2CO3, K2CO3, NaHCO3, NH4Cl, NH4I2, MgF2, CaF2, SrF2, BaF2, MgCl2, CaCl2, SrCl2, BaCl2, MgI2, CaI2, SrI2, BaI2, or the like can be used.

This heat treatment can be divided into calcination in the atmosphere for completely making a $BaZrSi_3O_9$ crystal phase and main baking in reducing atmosphere for reducing and doping a Ba site with Eu which contributes to light emission, and heat treatments may be performed repeatedly. Cracking may be performed at every step.

The heat treatment time is one hour to twenty-four hours, preferably two to four hours.

If the heat treatment time is short, crystal growth is insufficient to decrease emission intensity. If the heat treatment time is too long, melting may occur. If melting and sintering occur, strong crushing is required, thereby decreasing emission intensity upon reception of crystal damage by crushing.

As for reducing atmosphere, a method is preferred in which, for example, the phosphor is put in a crucible together with a carbon source such as graphite or activated carbon, is covered with a lid, and is then baked in the atmosphere. Inactive atmosphere, such as Ar, $N_2$, may be used. Also, a strongly reducing gas, such as $H_2$ or $NH_3$, may be used. While stronger reducing atmosphere is advantageous for reduction of $Eu_2O_3$, an oxygen defect more tends to occur in the base crystal. Also, when baking is performed in reducing gas atmosphere such as hydrogen, an oxygen defect increases, affecting phosphor characteristics through self-absorption.

In the phosphor powder obtained by the reducing and baking, since sintering efficiently progresses, crushing or cracking process is required according to the degree of sintering in order to obtain a desired grain size.

That is, thus obtained phosphor powder includes a surface defect, and may affect emission characteristics negatively. Also, part of Eu2O3 may remain as not being reduced. Thus, for the purpose of recovering from the surface defect and promoting reduction of remaining Eu2O3, it is more preferable to perform grain adjustment by cracking after reducing and baking, and then repeatedly baking in reducing temperature.

Recovery from the surface defect can be confirmed by directly observing the particle surface by a SEM or the like. Progress of reduction of Eu2O3 can be confirmed by comparing intensities of subtle emission spectrums in a spike shape appearing near 620 nm when the obtained phosphor powder is excited at a wavelength on the order of 250 nm to 300 nm. The repeated heat treatments further improve the emission intensity.

Also at the time of reducing and firing again, adding the above-described flux is more effective for crystal growth and particle growth.

An optimal temperature for re-baking differs depending on whether a flux is added, and is preferably 1100° C. to 1500° C. If the temperature is lower than 1100° C., a sufficient effect cannot be obtained. If the temperature exceeds 1500° C., sintering progresses, and strong crushing is thus required. In the end, a surface defect is generated again, and therefore a sufficient effect cannot be obtained.

Furthermore, to recover an oxygen defect generated here, a heat treatment can be performed in the atmosphere after the reducing and baking process, thereby improving fluorescent luminance.

In $ZrO2$ included as a constituent, an oxygen defect easily occurs in reducing atmosphere. Therefore, an oxygen defect occurs also in $BaZrSi3O9$:Eu obtained by reducing and baking. This oxygen defect in the base crystal serves as the center of recombination in the course of excitation and light emission, increasing a radiationless transition not contributing to light emission to cause a decrease in luminance.

Thus, by performing a heat treatment on the obtained phosphor powder under oxygen atmosphere such as in the atmosphere (air), recovery from the oxygen defect on the powder surface is achieved by the reducing process of the previous stage, and thereby luminance can be significantly increased. In particular, when the reducing process of the previous stage is performed by using strongly-reducing hydrogen, the amount of oxygen defects introduced may be increased. Therefore, a heat treatment in this atmosphere containing oxygen is effective in luminance recovery.

Also, a physical damage is present on the powder surface through the crushing process, and this damage also affects luminance. It is thought that recovery from this physical defect by the heat treatment can be expected, thereby contributing to an improvement in luminance.

As the heat-treatment atmosphere as above, an oxygen gas at any concentration can be used as long as it is under the presence of oxygen.

The optimum oxygen concentration cannot be uniquely determined because it changes depending on the calcination condition and the reducing and baking condition (the degree of the oxygen defect) for a precursor in a test sample. Nevertheless, an effect of significantly improving luminance can be obtained in a heat treatment in the atmosphere, and the equipment can be simplified, therefore this heat treatment is effective in an industrial point of view. However, this does not restrict recovery annealing from an oxygen defect by using an oxygen gas at any concentration.

The heat treatment temperature cannot be uniquely determined either because it changes depending on the degree of the oxygen defect in the phosphor and the oxygen concentration. In the case of the heat treatment in the atmosphere, the temperature is preferably 500° C. or higher and 1500° C. or lower. At a temperature lower than 500° C., a sufficient luminance improvement effect (recovery from the oxygen defect) cannot be obtained. At a temperature exceeding 1500° C., reduced and doped divalent Eu is oxidized to become trivalent Eu or cause the test sample to melt, thereby decreasing luminance. Moreover, the temperature is more preferably 800° C. or higher and 1300° C. or lower.

EXAMPLES

In the following, the present invention is specifically described with examples and comparative examples.

X-ray diffraction of the obtained phosphor was measured by "fully-automatic multipurpose X-ray diffraction instrument X'pert Pro MPD" manufactured by Spectris Co., Ltd.

For fluorescence measurement, "F-4500-type spectroscope and fluorometer" manufactured by Hitachi, Ltd. was used to measure an excitation spectrum at an emission wavelength of 480 nm and emission intensities at excitation wavelengths of 300 nm, 380 nm, 400 nm, and 420 nm. In PL spectrums shown in FIG. 3, the excitation spectrums and an emission spectrum at an excitation wavelength of 300 nm enable to obtain a maximum emission intensity were compared.

An absorption ratio was measured by a spectrophotometer UV-3100 manufactured by Shimadzu Corporation. Standard white barium sulfate (BaSO4) was measured as a reference, a reflectance of the produced phosphor was then measured, and a ratio of the reflectance of the produced phosphor was calculated when the reflectance of the standard white barium sulfate (BaSO4) was taken as 100%.

Example 1

[Producing an Aqueous Solution of Metal Components]

Barium acetate $Ba(CH_3COO)_2$ as a Ba source, $ZrCl_2O.8H2O$ as a Zr source, and $Eu(NO_3)_3.6H2O$ as an Eu source were each prepared with distilled water so as to have a constant volume, with a metal element concentration being set as 1 mol/L.

A water-soluble silicon compound of a Si source was produced by adding 22.8 g (0.3 mol) of 1,2-propanediol with respect to 20.8 g (0.1 mol) of tetraethoxysilane, mixing for twenty-four hours with stirring using a hot stirrer to be the solution temperature of 54° C., adding 2 g (0.02 mol) of lactic acid, and then further mixing at the solution temperature of 54° C. for one hour. Then, the compound was prepared with distilled water so as to have a constant volume, with a silicon concentration being set as 1 mol/L.

Citric acid was prepared with distilled water so as to have a constant volume at a 2 mol/L.

The aqueous solution of these metal materials was poured into a beaker with a pipet to achieve Ba:Zr:Si:Eu of 0.98:1.0:3.0:0.02, and the aqueous solution of citric acid was further poured into the beaker so as to achieve four times moles of a total amount of all metal elements. Next, a gelation process was performed by a hot stirrer under a condition of 80° C. for two hours, and was then put into an oven for drying at 120° C. for twelve hours. After the drying, an umber gel was obtained. Then, a heat treatment under a condition of 550° C. for six hours was performed to dissolve an organic substance to form a precursor. The obtained precursor was cracked in a mortar and was subjected to a heat treatment in the atmosphere at 800° C. for twelve hours to remove carbon, and then calcined powder was obtained.

Figure 1:
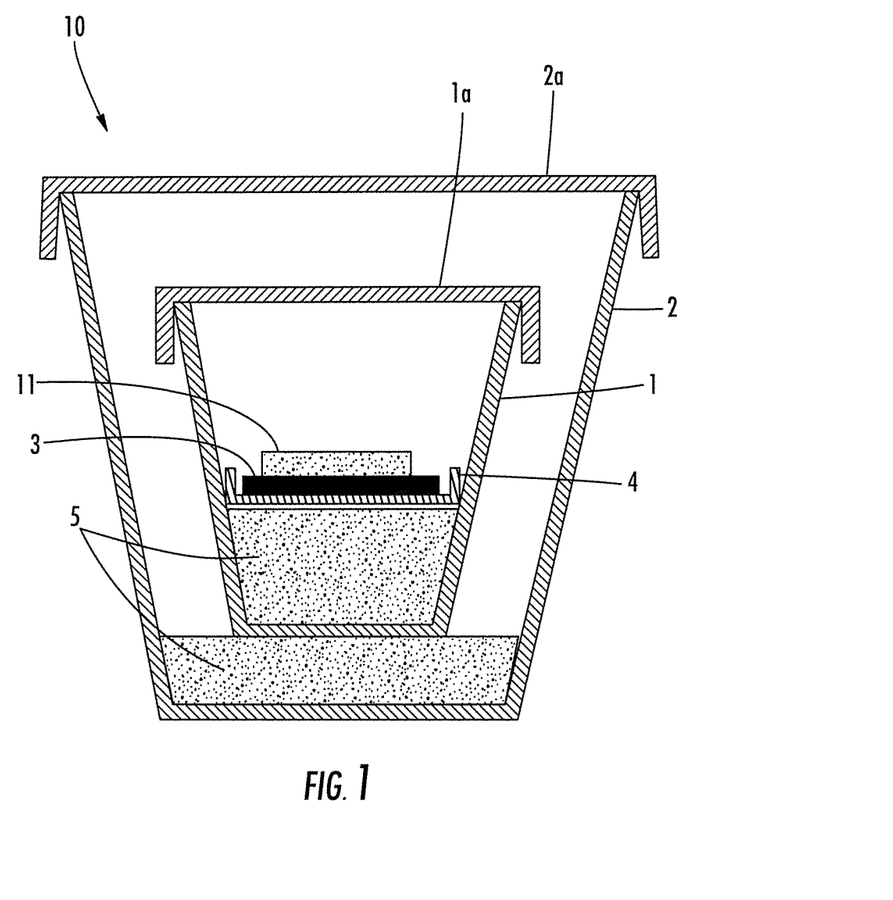
FIG. 1 is a schematic diagram for illustrating a double crucible method for use at the time of a heat treatment for forming a phosphor.

Next, a heat treatment was performed in reducing atmosphere by inserting this obtained calcined powder 11 into a double crucible 10 as depicted in FIG. 1. The internal structure of the crucible used for this heat treatment is depicted in FIG. 1.

By using this double crucible method, a heat treatment can be performed under CO—CO2 reducing atmosphere in a simplified manner.

In this heat treatment, the calcined powder 11 was first placed on an alumina-made plate 4 with a carbon sheet 3 laid thereon, and this plate was put into an alumina crucible 1 with graphite powder 5 laid thereon, and was then covered with a lid 1a. Then, the graphite powder 5 was laid on the bottom of an alumna crucible 2 next larger than the alumina crucible 1, and the alumina crucible 1 was then put onto the graphite powder 5, and the lid 2a of the alumina crucible 2 was closed. This was put into a small-sized box furnace (of KBF314N1 type), and a heat treatment was performed in reducing atmosphere at 1400° C. for two hours.

Heat-treated test samples were slightly sintered, and therefore were cracked to obtain phosphor powder. The obtained phosphor exhibited a diffraction pattern of BaZrSi3O9 described in ICDD (29-0214), as depicted in 2-1 of FIG. 2. A PL spectrum is depicted in FIG. 3, and relative emission intensities at respective excitation wavelengths (300 nm, 380 nm, 400 nm, and 420 nm) are also depicted in Table 1.

Example 2

Phosphor powder was produced by performing processes similar to those of Example 1 except that a material aqueous solution was poured into a beaker with a pipet so that Ba:Zr:Si:Eu was 0.98:1.0:3.3:0.02.

Figure 2:
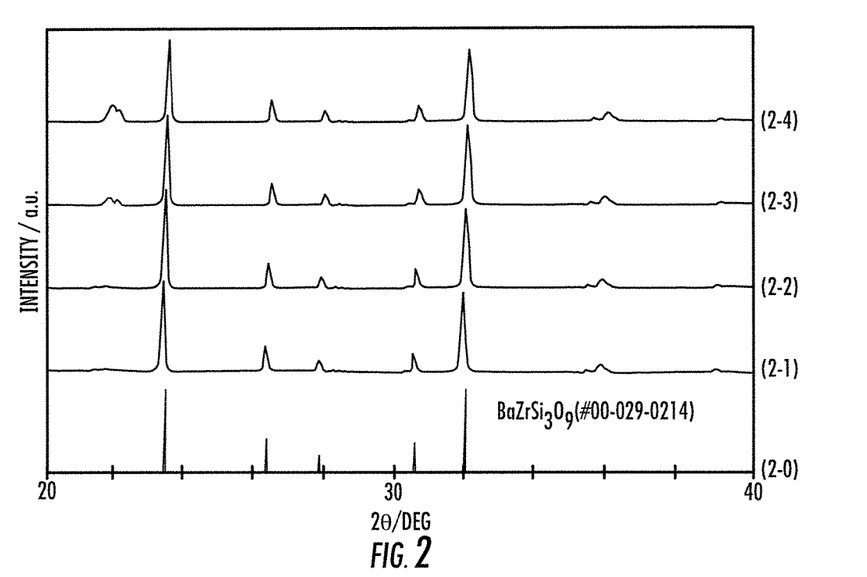
FIG. 2 is a diagram depicting X-ray diffraction patterns of phosphor powders produced in examples, 2-0 representing a diffraction pattern of "BaZrSi3O9" described in ICDD (29-0214), 2-1 representing a diffraction pattern of phosphor powder in Example 1, 2-2 representing a diffraction pattern of phosphor powder in Example 2, 2-3 representing a diffraction pattern of phosphor powder in Example 3, and 2-4 representing a diffraction pattern of phosphor powder in Example 4.
Figure 3:
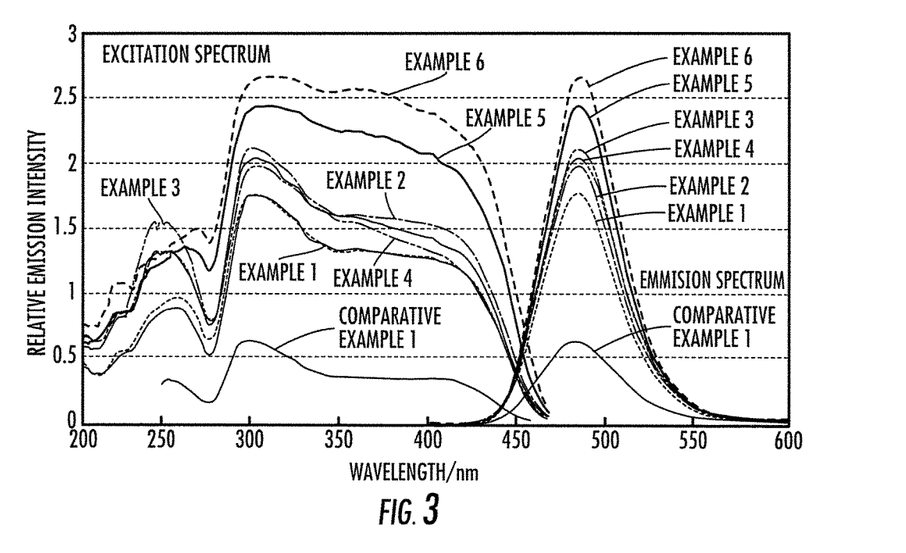
FIG. 3 is a diagram of PL spectrums of phosphor powders produced in Examples 1 to 6 and Comparative Example 1.

Its XRD pattern is depicted in 2-2 of FIG. 2.

The obtained phosphor exhibited a diffraction pattern of BaZrSi3O9 described in ICDD (29-0214) (refer to 2-0 of FIG. 2). Furthermore, a weak SiO2 (cristobalite) phase was observed near 2θ=22 degrees.

A PL spectrum is depicted in FIG. 3, and relative emission intensities at respective excitation wavelengths are also depicted in Table 1.

Example 3

Phosphor powder was produced by performing processes similar to those of Example 1 except that a material aqueous solution was poured into a beaker with a pipet so that Ba:Zr:Si:Eu was 0.98:1.0:4.5:0.02.

An XRD pattern is depicted in 2-3 of FIG. 2. The obtained phosphor exhibited a diffraction pattern of BaZrSi3O9 described in ICDD (29-0214). Furthermore, a SiO2 (cristobalite) phase was observed near 2θ=22°.

A PL spectrum is depicted in FIG. 3, and relative emission intensities at respective excitation wavelengths are also depicted in Table 1.

Example 4

Phosphor powder was produced by performing processes similar to those of Example 1 except that a material aqueous solution was poured into a beaker with a pipet so that Ba:Zr:Si:Eu was 0.98:1.0:6.0:0.02.

Its XRD pattern is depicted in 2-4 of FIG. 2. The obtained phosphor exhibited a diffraction pattern of $BaZrSi_3O_9$ described in ICDD (29-0214). Furthermore, a $SiO_2$ (cristobalite) phase was observed near 2θ=22°.

A PL spectrum is depicted in FIG. 3, and relative emission intensities at respective excitation wavelengths are also depicted in Table 1.

Example 5

The phosphor powder produced in Example 2 was again subjected to a heat treatment in reducing atmosphere in a graphite double crucible at 1400° C. for two hours.

A PL spectrum is depicted in FIG. 3, and relative emission intensities at respective excitation wavelengths are also depicted in Table 1.

Example 6

Phosphor powder was produced by performing processes similar to those of Example 5 except that prepared Ba:Zr:Si:Eu was 0.96:1.0:3.3:0.04.

A PL spectrum is depicted in FIG. 3, and relative emission intensities at respective excitation wavelengths are also depicted in Table 1.

Example 7

The phosphor powder obtained in Example 1 was put into an alumina crucible, and was put into a small-sized box furnace (of KBF314N1 type), and a heat treatment was performed in the air atmosphere at 500° C. for one hour to obtain phosphor powder. The fluorescence characteristics of the obtained phosphor powder were evaluated and collectively depicted in FIG. 5 and Table 1.

Example 8

The phosphor powder obtained in Example 1 was put into an alumina crucible, and was put into a small-sized box furnace (of KBF314N1 type), and a heat treatment was performed in the air atmosphere at 1000° C. for one hour to obtain phosphor powder. The fluorescence characteristics of the obtained phosphor powder were evaluated and collectively depicted in FIG. 5 and Table 1.

Example 9

The phosphor powder obtained in Example 1 was put into an alumina crucible, and was put into a small-sized box furnace (of KBF314N1 type), and a heat treatment was performed in the air atmosphere at 1200° C. for one hour to obtain phosphor powder. The fluorescence characteristics of the obtained phosphor powder were evaluated and collectively depicted in FIG. 5 and Table 1.

Example 10

Calcined powder was produced under the same condition as that of Example 1 and was put into a tabletop high-temperature tube furnace (TSR-630 manufactured by Yamada Denki Co., Ltd.), and a heat treatment was performed in reducing atmosphere at 1400° C. for two hours as letting argon gas containing 4% of hydrogen gas flow at a flow rate of 100 ml/minute to obtain phosphor powder.

This phosphor powder had a 480 nm-photoreflectance of 67.3%, and had extremely low emission intensity.

Then, the obtained phosphor powder was put into an alumina crucible, and was put into a small-sized box furnace (of KBF314N1 type), and a heat treatment was performed in the air atmosphere at 1200° C. for one hour to obtain phosphor powder. The fluorescence characteristics of the obtained phosphor powder were evaluated and collectively depicted in FIG. 5 and Table 1.

Comparative Example 1

Materials of $BaCO_3$ (manufactured by KANTO CHEMICAL CO., INC., at a purity of 3N), ZrO2 (manufactured by Wako Pure Chemical Industries, Ltd.), $SiO_2$ (manufactured by Wako Pure Chemical Industries, Ltd.), and $Eu_2O_3$ (manufactured by Furuuchi Chemical Corporation) were each weighed so that the mole ratio of Ba:Zr:Si:Eu was 0.98:1.0:3.0:0.02, and were mixed in an agate mortar for twenty minutes.

Figure 5:
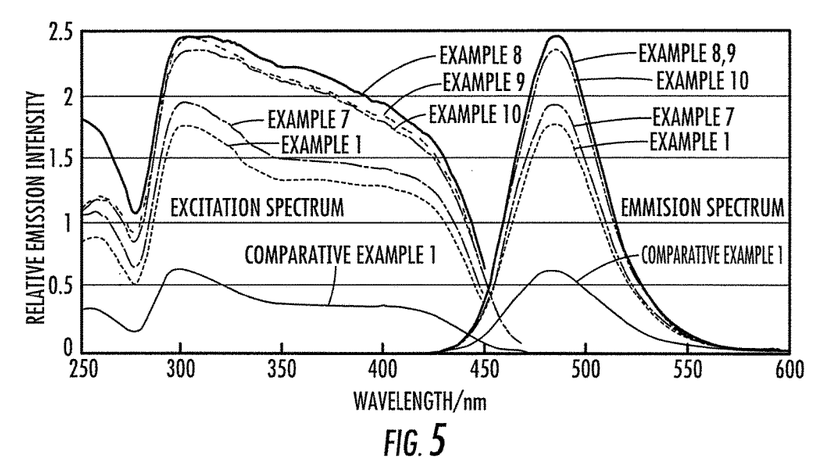
FIG. 5 is a diagram of PL spectrums of phosphor powders produced in Examples 1, 7-10, and Comparative Example 1.

This was subjected to a heat treatment at 1400° C. for two hours in a graphite double crucible similar to that of Example 1. As with Example 1, the obtained phosphor exhibited a diffraction pattern of $BaZrSi_3O_9$ described in ICDD (29-0214). A PL spectrum is depicted in FIGS. 3 and 5, and relative emission intensities at respective excitation wavelengths are also depicted in Table 1. The emission intensity was extremely low.

Comparative Example 2

A heat treatment in the atmosphere was performed with the same condition as that of Example 7, except that the heat treatment temperature was set at 450° C., to obtain phosphor powder. The phosphor powder had fluorescence characteristics not different from those of Example 1, exhibited emission characteristics at the same degree, and no improvement in characteristic by heat treatment in the atmosphere was not observed.

Comparative Example 3

A heat treatment in the atmosphere was performed with the same condition as that of Example 7, except that the temperature for the heat treatment in the atmosphere on the phosphor powder obtained in Example 1 was set at 1550° C., to obtain phosphor powder. The phosphor was melted and dissolved, and did not emit light.

significantly stronger emission intensity than Comparative Example 1 by a conventional solid phase method.

Examples 2, 3, and 4 that are richer in SiO2 than a stoichiometry have emission intensity larger than that of Example 1. Also, in the phosphors of Examples 5 and 6 where the reducing and baking process was performed again, the emission intensity is particularly significantly improved.

Figure 4A:
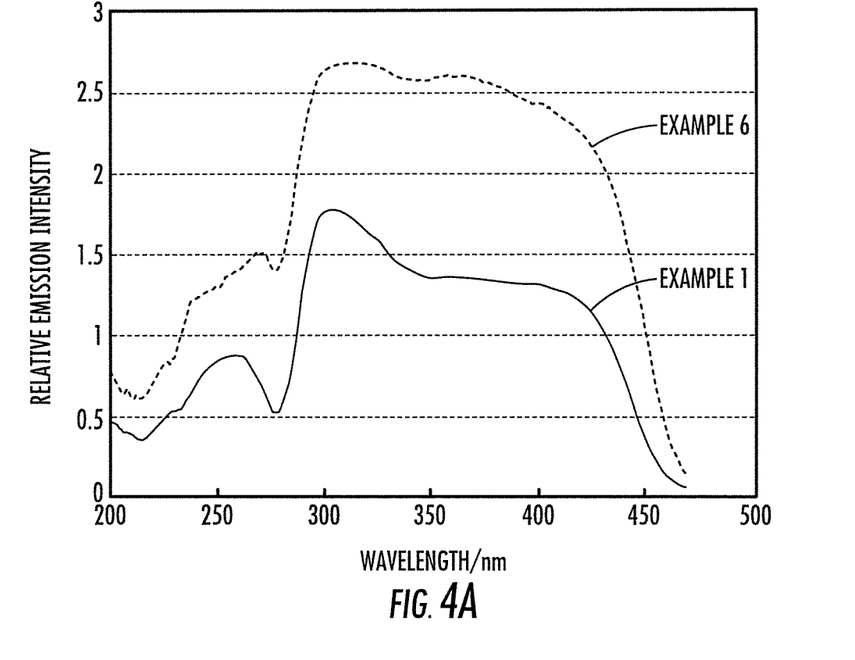
Figure 4B:
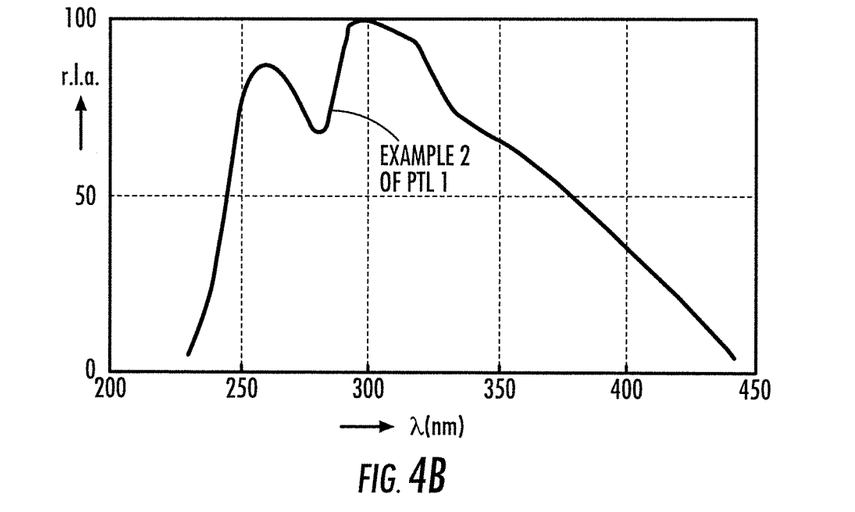

Further, from the comparison in excitation spectrum shape of FIG. 4, it is evident that the $BaZrSi_3O_9$:Eu phosphor according to the present invention has a shape different from that of a known excitation spectrum (refer to Example 2, FIG. 4(b) of PTL 1).

As evident from FIG. 5 and Table 1, regarding the effect of the heat treatment under oxygen atmosphere to be performed after a reducing process, as depicted in Examples 7 to 10, in Examples 7 to 10 where a heat treatment was performed in the scope of the present invention, that is, under oxygen atmosphere such as atmosphere (air) in a temperature range of 500° C. to 1500° C., it can be found that excitation characteristics and emission characteristics are both improved, compared with Example 1 without this heat treatment. In particular, a significant improvement is observed in Examples 8, 9, and 10 where a process was performed at a heat treatment temperature of 1000° C. to 1200° C.

On the other hand, in Comparative Example 2 where this heat treatment temperature was low, that is, 450° C., no improvement more than Example 1 is observed in both of excitation characteristics and emission characteristics, and the heat treatment effect is not observed. Moreover, in Comparative Example 3 where the temperature was too high, it is impossible to produce a test sample.

TABLE 1

|  | $I_{ex}^{300\,nm}$ | $I_{ex}^{380\,nm}$ | $I_{ex}^{400\,nm}$ | $I_{ex}^{420\,nm}$ | $\dfrac{I_{ex}^{400\,nm}}{I_{ex}^{300\,nm}} \times 100$ | Emission intensity change ratio [%] $(I_{ex}^{390\,nm} - I_{ex}^{420\,nm}) / I_{ex}^{380\,nm} \times 100$ | 480 nm spectral reflectance |
|---|---|---|---|---|---|---|---|
| Example 1 | 1.77 | 1.31 | 1.29 | 1.16 | 72.9 | 11.5 | 82.9 |
| Example 2 | 1.99 | 1.58 | 1.54 | 1.38 | 77.4 | 12.7 | 83.5 |
| Example 3 | 2.11 | 1.51 | 1.43 | 1.26 | 67.8 | 16.6 | 84.5 |
| Example 4 | 2.04 | 1.44 | 1.33 | 1.14 | 65.2 | 20.8 | 84.6 |
| Example 5 | 2.44 | 2.17 | 2.06 | 1.84 | 84.4 | 15.2 | 84.2 |
| Example 6 | 2.66 | 2.49 | 2.38 | 2.16 | 89.5 | 13.3 | 84.6 |
| Example 7 | 1.94 | 1.47 | 1.43 | 1.29 | 73.7 | 12.2 | 81.7 |
| Example 8 | 2.47 | 1.95 | 1.82 | 1.58 | 73.7 | 19.0 | 85.7 |
| Example 9 | 2.45 | 2.06 | 1.92 | 1.67 | 78.4 | 18.9 | 84.5 |
| Example 10 | 2.36 | 1.93 | 1.77 | 1.55 | 75.0 | 19.7 | 80.7 |
| Comparative example 1 | 0.64 | 0.35 | 0.36 | 0.31 | 56.3 | 11.4 | — |
| PTL 1 (estimated value) | — | — | — | — | 35 | 35 | — |

[Evaluation Results of Phosphor Powder]

As evident from FIG. 3 and Table 1, the emission intensity at an excitation wavelength of 400 nm of the phosphors in Examples 1 to 10 according to the present invention is 65% to 90% of the emission intensity at an excitation wavelength of 300 nm. The phosphors have high emission intensity even in excitation at 400 nm. Also, an emission intensity change ratio represented by an equation of $(I_{ex}^{380\,nm} - I_{ex}^{420\,nm}) / I_{ex}^{380\,nm} \times 100$ is 30% or lower. It can be found that any phosphor exhibits a flat excitation spectrum up to the neighborhood of 400 nm, which is an emission wavelength of a near-ultraviolet LED. In particular, Examples 1 to 6 using the producing method of the present invention exhibit Furthermore, the spectral reflectance of any phosphor in the examples at 480 nm is 80% or higher when the value of spectral reflectance of standard white barium sulfate is taken as 100%, and self absorption is low.

Figure 6:
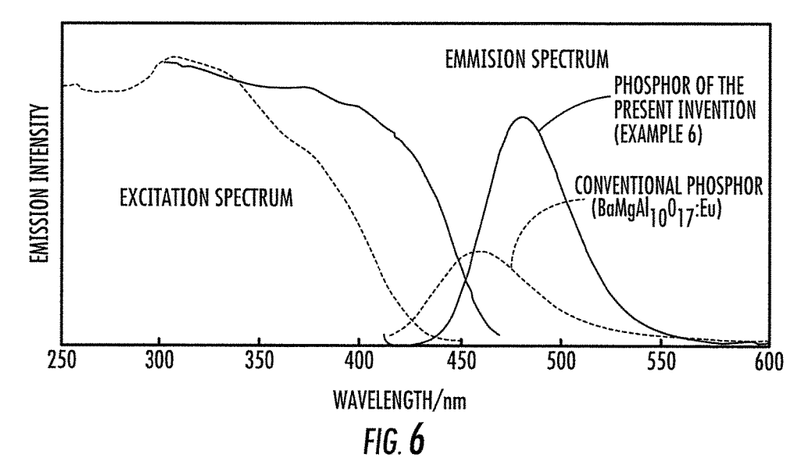
FIG. 6 is a diagram representing a comparison between the phosphor produced in Example 6, which is phosphor powder according to the present invention, and a conventional phosphor.

Still further, FIG. 6 depicts a comparison in emission spectrum and excitation spectrum at an emission peak wavelength between the produced phosphor powder (Example 6) and a blue phosphor of a commercially-available product [BaMgAl10O17:Eu] (2464 manufactured by OSRAM SYLVANIA Inc., which is also referred to as BAM) at the time of excitation at 405 nm. As evident from FIG. 6, it can be found that the phosphor according to the present invention has an excitation spectrum extending to a region exceeding 400 nm compared with the conventional blue phosphor BAM and has a high emission intensity in excitation at 405 nm twice or more as large as that of BAM.

As described above, the BaZrSi$_3$O$_9$:Eu phosphor according to the present invention has a high emission intensity of about 400 nm, which is an emission wavelength of a near-ultraviolet LED, and has a small change of emission intensity with respect to a change of an excitation wavelength. Therefore, the silicate phosphor of the present invention is highly suitable as a blue phosphor for near-ultraviolet LED excitation.

REFERENCE SIGNS LIST 1 alumina crucible (inside)
1a lid of alumina crucible 1
2 alumina crucible (outside)
2a lid of alumina crucible 2
3 carbon sheet
4 alumina-made plate
5 graphite powder
10 double crucible
11 calcined powder

The invention claimed is:

1. A method of producing a silicate phosphor represented by a composition formula of Ba$_{1-x}$Eu$_x$ZrSi$_y$O$_{3+2y}$ (where 0.001≤x≤0.5 and 2.5≤y≤3), the silicate phosphor having: a diffraction pattern of BaZrSi$_3$O$_9$ as a powder X-ray diffraction pattern; an emission intensity at an excitation wavelength of 400 nm, the emission intensity being 70% or higher of an emission intensity at an excitation wavelength of 300 nm; and an emission intensity change ratio represented by the following Equation (1), the emission intensity change ratio being 30% or lower in a range of excitation wavelengths of 380 nm to 420 nm, the method comprising the following steps 1 to 3:

Step 1 of mixing Ba, Zr, Eu, and Si elements, the elements being metal components in constituents, as an aqueous solution, adding oxycarbonic acid therein, heating the mixed solution to cause gelation of the mixed solution, and then drying to form a gel;

Step 2 of baking the gel formed in the step 1 in atmosphere to remove an organic substance contained in the gel and producing a precursor with the constituents uniformly distributed therein; and Step 3 of performing a heat treatment on the precursor obtained in the step 2 in reducing atmosphere to obtain a BaZrSi$_3$O$_9$ crystal phase and, at the same time, reducing and doping a Ba site with Eu to form silicate phosphor powder

[Equation 1]

$$\text{Emission intensity change ratio (\%)} = (I_{ex}^{380\,nm} - I_{ex}^{420\,nm}) / I_{ex}^{380\,nm} \times 100 \quad (1)$$

$I_{ex}^{380\,nm}$: emission intensity at an excitation wavelength of 380 nm, and
$I_{ex}^{420\,nm}$: emission intensity at an excitation wavelength of 420 nm.

2. A method of producing a silicate phosphor represented by a composition formula of Ba$_{1-x}$Eu$_x$ZrSi$_y$O$_{3+2y}$ (where 0.001≤x≤0.5 and 3<y≤6), the silicate phosphor having diffraction pattern of BaZrSi$_3$O$_9$ as a powder X-ray diffraction pattern and a peak derived from SiO$_2$, the method comprising the following steps 1 to 3:

Step 1 of mixing Ba, Zr, Eu, and Si elements, the elements being metal components in constituents, as an aqueous solution, adding oxycarbonic acid therein, heating the mixed solution to cause gelation of the mixed solution, and then drying to form a gel;

Step 2 of baking the gel formed in the step 1 in atmosphere to remove an organic substance contained in the gel and producing a precursor with the constituents uniformly distributed therein; and Step 3 of performing a heat treatment on the precursor obtained in the step 2 in reducing atmosphere to obtain a BaZrSi$_3$O$_9$ crystal phase and, at the same time, reducing and doping a Ba site with Eu to form silicate phosphor powder.

3. The method of producing the silicate phosphor according to claim 2, further comprising a step of performing a heat treatment on the silicate phosphor powder produced in the step 3 under reducing atmosphere.

4. The method of producing the silicate phosphor according to claim 2, further comprising a step of performing a heat treatment on the silicate phosphor powder produced in the step 3 at temperatures 500° C. to 1500° C. under atmosphere.

5. The method of producing the silicate phosphor according to claim 1, further comprising a step of performing a heat treatment on the silicate phosphor powder produced in the step 3 under reducing atmosphere.

6. The method of producing the silicate phosphor according to claim 1, further comprising a step of performing a heat treatment on the silicate phosphor powder produced in the step 3 at temperatures 500° C. to 1500° C. under atmosphere.

* * * * *